United States Patent [19]

Nalette et al.

[11] Patent Number: 5,480,625

[45] Date of Patent: Jan. 2, 1996

[54] ENHANCING CARBON DIOXIDE SORPTION RATES USING HYGROSCOPIC ADDITIVES

[75] Inventors: Timothy A. Nalette, Tolland; Philip J. Birbara, Windsor Locks, both of Conn.

[73] Assignee: United Technologies Corporation, Hartford, Conn.

[21] Appl. No.: 941,826

[22] Filed: Sep. 8, 1992

Related U.S. Application Data

[62] Division of Ser. No. 840,228, Feb. 24, 1992, Pat. No. 5,214,019.

[51] Int. Cl.$^6$ .................... C01B 31/20; C01B 5/00; B01D 53/14

[52] U.S. Cl. .................... 423/230; 423/220; 423/232; 502/400; 95/117; 95/139

[58] Field of Search .................... 502/60, 64, 174, 502/400, 407, 411, 412, 415; 55/68; 423/230, 232, 220; 95/117, 139; 266/156; 75/464

[56] References Cited

U.S. PATENT DOCUMENTS

| | | | |
|---|---|---|---|
| 2,769,016 | 10/1956 | Lichtenwalter et al. | 260/348.5 |
| 3,232,028 | 2/1966 | McDonald et al. | 55/68 |
| 3,511,595 | 5/1970 | Fuchs | 23/4 |
| 3,619,130 | 11/1971 | Ventriglio et al. | 23/25 |
| 3,865,924 | 2/1975 | Gidgspow et al. | 423/230 |
| 4,047,894 | 9/1977 | Kühl | 23/284 |
| 4,414,135 | 11/1983 | Nojiri et al. | 502/224 |
| 4,415,476 | 11/1983 | Ayame et al. | 502/224 |
| 4,997,803 | 3/1991 | van der Smissen et al. | 502/400 |
| 5,079,209 | 1/1992 | Nalette et al. | 502/411 |
| 5,091,358 | 2/1992 | Birbara et al. | 502/412 |
| 5,135,548 | 8/1992 | Golden et al. | 55/25 |
| 5,174,974 | 12/1992 | Birbara et al. | 423/230 |
| 5,186,727 | 2/1993 | Chang | 55/35 |
| 5,202,298 | 4/1993 | Schubert et al. | 502/174 |
| 5,214,019 | 5/1993 | Nalette et al. | 502/400 |

FOREIGN PATENT DOCUMENTS

| | | | |
|---|---|---|---|
| 0445776 | 9/1991 | European Pat. Off. | 502/400 |
| 0485322 | 5/1992 | European Pat. Off. | 502/400 |
| 5884039 | 5/1983 | Japan | 502/427 |

OTHER PUBLICATIONS

"Chemical Principles" by William L. Masterton et al., W. B. Saunders Co.; 4th ed., 1977, p. 153.

"Gas Purification" Third Edition by Arthur L. Kohl and Fred C. Riesenfeld by Gulf Pubishing Co., USA; Apr. 1979, p. 166 Equation (5–6).

G. V. Colombo; Study of $CO_2$ Sorbents for Extravehicular Activity; Jul. 1973.

Primary Examiner—Gary P. Straub
Assistant Examiner—Timothy C. Vanoy
Attorney, Agent, or Firm—Mary R. Bonzagni; Holand & Associates

[57] ABSTRACT

Carbon dioxide sorption using a metal oxide-alkali metal carbonate sorbent typically requires a relative humidity of greater than 25% in order to obtain reaction rate constants of about 2.0 to 3.0 sec.$^1$ (see Equation 6). The incorporation of alkali halide salt into the metal oxide-alkali metal carbonate sorbent maintains rate constants of about 2.0 to about 4.0 sec.$^1$ at relative humidities below 25%. Therefore, the hygroscopic alkali halide salt attracts water, thereby providing the necessary hydroxide ions for enhanced absorption at low relative humidities.

5 Claims, 1 Drawing Sheet

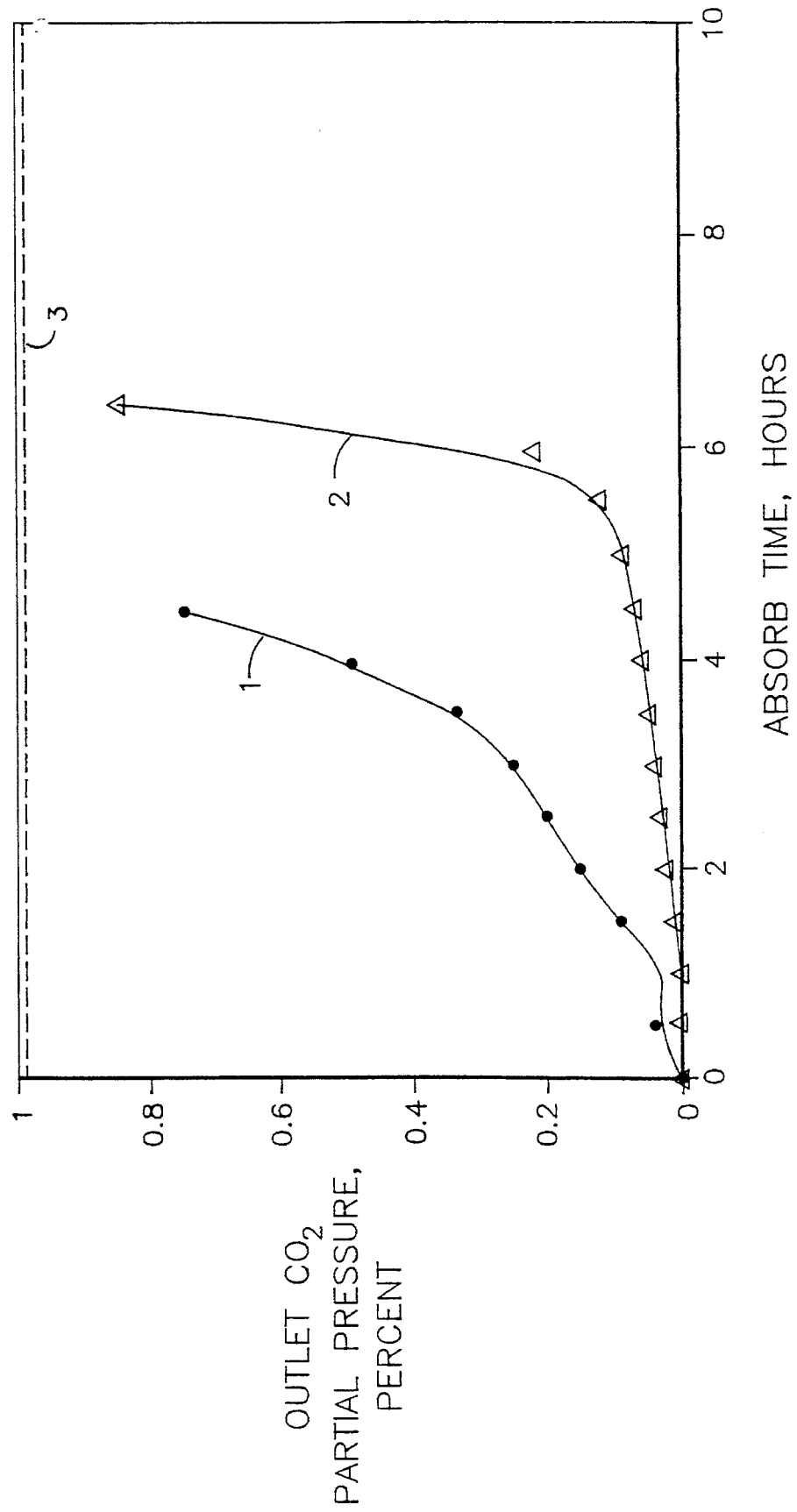

ENHANCING CARBON DIOXIDE SORPTION RATES USING HYGROSCOPIC ADDITIVES

This is a division of application Ser. No. 07/840,228 filed on Feb. 14, 1992, now U.S. Pat. No. 5,214,019.

TECHNICAL FIELD

The present invention relates to the removal of carbon dioxide from a gaseous stream, and especially to enhancing carbon dioxide removal rates in low relative humidity environments.

Background of the Invention

In closed environments such as submarines, spacecraft, and spacesuits, atmospheric carbon dioxide partial pressures increase in concentration due to respiration. Increased carbon dioxide partial pressures can be a health hazard since carbon dioxide concentrations exceeding about 7.6 millimeters of mercury (mmHg) (partial pressure of 1.0%) are not safe for breathing for extended periods of time. As a result, in order to maintain a safe, habitable environment, it is necessary to remove carbon dioxide from these closed environments and thereby attain an acceptable carbon dioxide concentration below about 3.8 mmHg (partial pressure of 0.5%).

Carbon dioxide can be removed from these environments by passing the carbon dioxide containing atmosphere through a reactor containing a selective carbon dioxide sorbent. In the reactor, the carbon dioxide is absorbed by the sorbent and therefore removed from the closed environment. Typical carbon dioxide sorbents include regenerable and non-regenerable molecular sieves, metal oxides, alkali metal hydroxides, alkali metal carbonates, and others.

A particularly useful regenerable carbon dioxide sorbent capable of high carbon dioxide loadings, up to approximately 20 lbs/ft$^3$, is a metal oxide-alkali metal carbonate sorbent, such as a silver oxide-cesium carbonate sorbent. (see U.S. Pat. No. 5,091,358) The postulated reaction mechanism for carbon dioxide removal using a silver oxide-cesium carbonate sorbent is:

$$Ag_2O + H_2O \leftrightarrows 2Ag^+ + 2OH^- \quad (1)$$

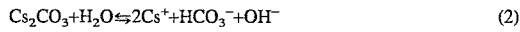

$$Cs_2CO_3 + H_2O \leftrightarrows 2Cs^+ + HCO_3^- + OH^- \quad (2)$$

$$CO_2 + OH^- \leftrightarrows HCO_3^- \quad (3)$$

$$HCO_3^- + OH^- \leftrightarrows H_2O + CO_3^= \quad (4)$$

$$2Ag^+ + CO_3^= \leftrightarrows Ag_2CO_3 \quad (5)$$

Basically, the silver oxide ($Ag_2O$) reacts with water ($H_2O$) to form silver ions ($Ag^+$) and hydroxide ions ($OH^-$) (Equation 1) while the cesium carbonate ($CsCO_3$) reacts with water to form hydroxide ions, cesium ions ($Cs^+$), and bicarbonate ions ($HCO_3^-$) (Equation 2). Carbon dioxide ($CO_2$) then reacts with the hydroxide ions to form bicarbonate ions (Equation 3) which react with additional hydroxide ions to form carbonate ions and water (Equation 4). Finally, the carbonate ions react with the silver ions to form silver carbonate ($Ag_2CO_3$) (Equation 5), thereby regenerating the cesium carbonate for additional carbon dioxide removal.

As is evident from the above equations, the absorption of carbon dioxide by a metal oxide-alkali metal carbonate sorbent requires the presence of hydroxide ions, and therefore water. Comparison of the rates of reaction for the absorption reaction, Equations 1–5, reveals that Equation 3, the reaction between the carbon dioxide and the hydroxide ions, is the slowest reaction and therefore rate determining reaction. As a result, the ability of the sorbent to absorb carbon dioxide is dependent upon the relative humidity of the atmosphere. At low relative humidities, below about 25%, a substantial decrease in carbon dioxide sorption rate is observed due to the reduced amount of hydroxide ions available to react with the carbon dioxide (see Equation 3).

Since the removal of carbon dioxide with the aforementioned sorbent is an exothermic reaction, the sorbent temperature increases as carbon dioxide is absorbed. As a result of the increased sorbent temperature, the relative humidity above the sorbent decreases causing water to evaporate from the sorbent reducing the amount of moisture available for reaction with carbon dioxide, and in turn, decreases the carbon dioxide sorption rate. Consequently, low relative humidity conditions require an active sorbent cooling system and/or additional sorbent in order to maintain the carbon dioxide sorption rate. However, volume, weight, and energy restrictions limit the use of these alternatives in most closed environment systems.

What is needed in the art is a carbon dioxide sorbent capable of maintaining carbon dioxide sorption rates associated with high relative humidities at relative humidities below about 25%.

Disclosure of the Invention

The present invention relates to a carbon dioxide sorbent which is capable of absorbing carbon dioxide at relative humidities below about 25%. The composition of this sorbent is metal oxide, alkali metal carbonate, and alkali halide salt.

The present invention further relates to a method for removing carbon dioxide from a gaseous stream. The carbon dioxide is removed by passing the gaseous stream containing the carbon dioxide through a reactor containing a carbon dioxide sorbent. The carbon dioxide intimately contacts the sorbent, thereby causing the carbon dioxide to be absorbed onto the sorbent. This sorbent is comprised of a metal oxide, alkali metal carbonate, and alkali halide salt, and is capable of absorbing carbon dioxide in relative humidities below about 25%.

The present invention also relates to a method for producing a carbon dioxide sorbent which is capable of absorbing carbon dioxide at relative humidities below about 25%. This method comprises dissolving an alkali metal carbonate and an alkali halide salt in a solvent to form a solution. A metal carbonate is then mixed into the solution to produce a dispersion which is formed into the desired shape of the sorbent and dried.

The foregoing and other features and advantages of the present invention will become more apparent from the following description and accompanying drawing.

BRIEF DESCRIPTION OF THE DRAWINGS

The FIGURE is a graph of the ability of the sorbent of the present invention to absorb carbon dioxide at a relative humidity between 15% and 16% versus a prior art metal oxide-alkali metal carbonate sorbent under the same conditions.

BEST MODE FOR CARRYING OUT THE INVENTION

In order to attain a sorbent capable of efficiently absorbing carbon dioxide at a relative humidity below about 25%, alkali halide salt is combined with metal oxide and alkali metal carbonate. The alkali halide salt is a hygroscopic additive which readily absorbs moisture from the atmosphere. The alkali metal carbonate, on the other hand, promotes carbon dioxide sorption, while the metal oxide acts as a regenerable, high capacity carbon dioxide absorbent.

Alkali halide salts which are particularly useful with the present invention include fluorides of cesium, potassium, and sodium, with cesium fluoride preferred due to its high solubility which simplifies the sorbent preparation process.

It is preferred to utilize the minimum amount of alkali halide salt necessary to attain the desired carbon dioxide sorption rate at the given relative humidity since the alkali halide salt, itself, does not absorb carbon dioxide, only moisture. Although additional alkali halide salt can be utilized, only insignificant improvements in the sorption rate are realized while carbon dioxide loadings decrease. Specific amounts of alkali halide salts for a given application can readily be determined by an artisan knowing the reaction mechanism.

Although applicants do not wish to be bound by theory, it is believed that the alkali halide salt attracts available moisture above the sorbent, thereby drawing water into the sorbent. This water is then utilized by the sorbent to enhance carbon dioxide sorption rates at low relative humidities through direct involvement in the carbon dioxide absorption reaction (Equation 3) and by acting as a transport medium.

The water is directly involved in the carbon dioxide absorption since the water reacts with alkali metal carbonate to form cesium ions, hydroxide ions, and bicarbonate ions. (Equation 2) These hydroxide ions react with the carbon dioxide at the interface between the sorbent and the gaseous stream to form bicarbonate ions. (Equation 3) These bicarbonate ions then react with additional hydroxide ions to form carbonate ions and water. (Equation 4)

Once the bicarbonate ions have been converted to carbonate ions, the water within the sorbent acts as a transport medium by allowing the carbonate ions to migrate within the sorbent. The sorbent is porous and provides capillaries which aid in the transport of the carbonate ions to the metal oxide. Therefore, the carbonate ions produced in Equation 4 can migrate to and react with metal ions to form metal carbonate. (Equation 5)

Since the water is both directly involved in the carbon dioxide absorption process and acts as a transport medium, it is preferred to have excess water in the sorbent. The preferred amount of alkali halide salt can readily be determined by an artisan based upon the porosity of the sorbent, the water absorption characteristics of the alkali halide salt, and the relative humidity above the sorbent. The optimum alkali halide salt concentration is attained when the amount of water attracted by the alkali halide salt is slightly less than the amount of water which would flood the pores of the sorbent as determined analytically or through experimentation. For example, the optimum alkali halide salt concentration for a metal oxide-alkali metal carbonate sorbent having carbon dioxide sorption rates of about 0.2 lb/hr in a relative humidity of about 15% (flow rate of 6 ft$^3$/min and sorbent bed size of 0.1 ft$^3$) is between about 10 mole percent (mole %) and about 15 mole %, with about 12 mole % preferred. Note, all mole percents are based upon the total moles of the combined metal oxide, alkali metal carbonate, and the alkali halide salt.

The alkali halide salt is preferably combined with alkali metal carbonate, wherein the alkali metal carbonate has a concentration in the sorbent of up to about 10 mole % with about 2 mole % to about 6 mole % preferred, and about 2.5 mole % to about 3.5 mole % especially preferred. Since the alkali metal carbonate is a carbon dioxide sorption promoter and since carbon dioxide sorption rates increase as the sorbent pH increases, the alkali metal carbonate is a carbonate having a pH above about 11.5, and preferably a pH of about 12 or greater. Carbonates of cesium, potassium, and sodium, can be utilized as sorption promoters, with cesium carbonate preferred.

Finally, the alkali halide salt and alkali metal carbonate are combined with metal oxide to form the carbon dioxide sorbent capable of absorption at low relative humidities. The metal oxide is a regenerable oxide and therefore capable of absorbing and desorbing carbon dioxide. Possible metal oxides include magnesium oxide, silver oxide, zinc oxide, and mixtures thereof, with silver oxide preferred due to its lower activation and regeneration energy requirements (i.e. temperatures between about 160° C. and about 200° C.). Since the sorbent typically contains between about 10 mole % and about 15 mole % alkali halide salt and up to about 10 mole % alkali metal carbonate, balance metal oxide, the metal oxide concentration is typically between about 75 mole % and about 88 mole %, with about 83 mole % to about 86 mole % preferred.

Preparation of the sorbent of the present invention can be accomplished with conventional sorbent preparation techniques. Additionally, the present sorbent can either be unsupported or supported on a porous support such as ceramic supports or molecular sieves. Since supports are inert compounds which add weight and volume to the sorbent without enhancing sorption rates or loading capacities, it is preferred to form the sorbent into unsupported pellets, cylinders, flat sheets, or another suitable shape (hereinafter referred to as pellets).

One method of preparing an unsupported form of the carbon dioxide sorbent of the present invention includes dissolving the alkali metal carbonate and the alkali halide salt in a solvent, typically water, to form a solution. The metal oxide is then added to the solution to form a dispersion having a paste-like consistency. The dispersion is then formed into the desired shape of the sorbent via conventional techniques such as extrusion or pelletizing. Finally, the sorbent is dried in air or heated to remove the solvent, and the sorbent is activated as discussed below.

If the sorbent is to be supported, conventional preparation consists of reacting soluble metal salts to form insoluble metal oxide or carbonate, i.e. soluble silver nitrate reacted with cesium carbonate forms insoluble silver carbonate and cesium nitrate. (The silver carbonate is later activated as discussed below to form silver oxide.) A support is then impregnated with the solution of soluble metal salt. The soluble metal salt is reacted to produce an insoluble metal oxide or carbonate. The insoluble metal oxide or carbonate impregnated support is dried and then further impregnated with solutions of the alkali metal carbonate and the alkali halide salt to form the sorbent. Finally, the sorbent is dried in air or heated to remove the solvent.

During the preparation process, the metal oxide is usually in another form, such as metal carbonate, metal nitrate, and other metal forms capable of being converted directly or indirectly to metal oxide. Typically, the metal oxide is in the form of metal carbonate once the sorbent is dried. Therefore, activation comprises converting the metal carbonate to metal oxide so that the metal oxide can be utilized to absorb carbon dioxide. This conversion requires heating the sorbent to a temperature which causes the metal carbonate to decompose from the carbonate to the metal oxide, thereby releasing carbon dioxide which can be vented. These temperatures are all known in the art. For silver carbonate, for example, the activation temperature ranges from about 160° C. to about 220° C. Once activated and cooled, the sorbent can be utilized for carbon dioxide absorption.

The activated sorbent is typically utilized in a reactor where a gaseous stream containing carbon dioxide is passed over the sorbent. The alkali halide salt attracts water vapor from the gaseous stream to provide adequate water content within the sorbent structure for the absorption process. This water reacts with the alkali metal carbonate to form hydroxide ions (Equation 2) which in turn react with the carbon dioxide in the gaseous stream to form bicarbonate ions (Equation 3). These bicarbonate ions react with additional hydroxide ions to form water and carbonate ions (Equation 4) which react with the metal oxide and water to form metal carbonate and hydroxide ions (combined Equations 1 and 5).

As the carbon dioxide is absorbed, the metal oxide converts to metal carbonate, the amount of metal carbonate in the sorbent increases, less metal oxide is available for absorption of carbon dioxide, and the carbon dioxide sorption rate and the efficiency of the sorbent decreases. Once the carbon dioxide sorbent is loaded to about 85% of its carbon dioxide capacity, the sorbent is considered saturated with carbon dioxide and must therefore be regenerated. Once saturated, the sorbent can be thermally regenerated or reactivated as described above in the activation process.

The invention will be clarified by reference to the following illustrative example. The example is given to illustrate a method for preparing the carbon dioxide sorbent of the present invention. It is not, however, intended to limit the generally broad scope of the present invention.

Example

The following method was used to produce a carbon dioxide sorbent comprised of: 85 mole % silver oxide, 3 mole % cesium carbonate, and 12 mole % cesium fluoride.
1. Cesium carbonate and cesium fluoride, 0.166 kilograms (kg) and 0.290 kg respectively, were dissolved in 1.8 liters of water to form a solution.
2. The solution was then combined with 5.31 kg of silver carbonate and mixed until an essentially homogenous paste-like dispersion was formed.
3. The dispersion was air dried for 72 hours.
4. The dried dispersion was then crushed with a mortar and pestle to form granules which were sieved to 12–20 mesh. The granules were subsequently used in a packed bed.

The sorbent formed in the above Example absorbed carbon dioxide at a rate of 0.2 lb/hr (sorbent bed size 0.1 ft$^3$, flow rate 6 ft$^3$/min) at a relative humidity of 15% for approximately 7 hrs. In contrast, a prior art sorbent comprised of 85 mole % silver oxide and 15 mole % cesium carbonate has an average carbon dioxide sorption rate of 0.1 lb/hr under similar conditions.

Referring to the FIGURE, which is meant to be exemplary, not limiting, Line 1 represents the metal oxide-alkali metal carbonate sorbent of the prior art (described above). In a relative humidity between 15% and 16%, this prior art sorbent was only capable of maintaining the outlet partial pressure of the carbon dioxide below 0.2% for about 2 hours. On the other hand, Line 2 represents the sorbent of the present invention (see the Example). The sorbent of the present invention maintained the outlet partial pressure of carbon dioxide below 0.2% for about 6 hours under the same conditions. Line 3 represents the carbon dioxide inlet partial pressure of about 0.99%.

In view of the FIGURE, the present invention is clearly an improvement over prior art carbon dioxide sorbents. Prior art sorbents were not capable of efficiently absorbing carbon dioxide at low relative humidities. At relative humidities above about 25%, the prior art sorbent typically has a carbon dioxide sorption rate constant of about 2.5 to about 3.0 sec.$^{-1}$. However, at relative humidities of about 15%, the prior art sorbent has a carbon dioxide sorption rate constant between about 1.0 and about 1.5 sec.$^{-1}$. Yet, the carbon dioxide sorbent of the present invention maintains a carbon dioxide sorption rate constant within the range of about 2.0 to about 4.0 sec.$^{-1}$ in relative humidities of about 15%, with carbon dioxide sorption rate constants between about 2.5 and about 3.0 sec.$^{-1}$ typical. Equation 6, below, describes the carbon dioxide sorption rate constant.

$$r = (k \cdot \theta \cdot P)/(R \cdot T) \qquad (6)$$

where: r=rate per unit volume
k=reaction constant (per second)
θ=fraction of unreacted material
P=partial pressure of carbon dioxide (atm)
R=gas constant (atm–moles/liter/K)
T=gas temperature (K)

As can be seen from the FIGURE, more than a two fold increase in the length of time the sorbent of the present invention (Line 2) is capable of maintaining a carbon dioxide outlet pressure below 0.2% compared to the prior art sorbent (Line 1) is observed. The sorbent of the present invention is capable of maintaining the carbon dioxide partial pressure below about 0.2% in relative humidities between about 15% and 16% for at least 6 hours compared to 2 hours of the prior art sorbent.

The alkali halide salt imparts a hygroscopic property to the sorbent. Therefore, the combination of the alkali halide salt with the metal oxide and the alkali metal carbonate results in a carbon dioxide sorbent capable of high sorption rates in low relative humidities. As a result, low relative humidity conditions no longer require the use of active cooling or increased amounts of sorbent in order to absorb a given amount of carbon dioxide at a given rate.

Although this invention has been shown and described with respect to detailed embodiments thereof, it will be understood by those skilled in the art that various changes in form and detail thereof may be made without departing from the spirit and scope of the claimed invention.

We claim:
1. A method for removing carbon dioxide from the atmosphere in a closed human habitable environment comprising the steps of: passing a stream of the atmosphere containing carbon dioxide through a reactor containing a carbon dioxide sorbent; contacting the sorbent with the stream to absorb carbon dioxide to onto said sorbent thereby removing said carbon dioxide from the stream, wherein the sorbent comprises:
  a. a metal oxide;
  b. an alkali metal carbonate; and
  c. hygroscopic alkali fluoride;

wherein said sorbent removes carbon dioxide from the gaseous stream including removal at relative humidities below about 25%.

2. A method for removing carbon dioxide as in claim 1 wherein said metal oxide is selected from the group consisting of magnesium oxide, silver oxide, zinc oxide, and mixtures thereof.

3. A method for removing carbon dioxide as in claim 1 wherein said alkali metal carbonate is selected from the group consisting of cesium carbonate, potassium carbonate and sodium carbonate.

4. A method for removing carbon dioxide as in claim 1 wherein said alkali fluoride is selected from the group consisting of cesium fluoride, potassium fluoride and sodium fluoride.

5. A method for removing carbon dioxide as in claim 1 wherein said sorbent comprises up to about 10 mole % alkali metal carbonate, between about 10 mole % and about 15 mole % alkali fluoride, balance metal oxide.

* * * * *